Patented Oct. 25, 1932

1,884,354

UNITED STATES PATENT OFFICE

CHARLES J. STROSACKER AND EARL L. PELTON, OF MIDLAND, MICHIGAN, ASSIGNORS TO THE DOW CHEMICAL COMPANY, OF MIDLAND, MICHIGAN, A CORPORATION OF MICHIGAN

METHOD OF MAKING SALTS OF ALIPHATIC ACIDS

No Drawing.   Application filed February 16, 1928.   Serial No. 254,889.

The present invention relates to the preparation of aliphatic carboxylic acids or salts thereof, e. g., an acetate, from a halogen substitution product of the corresponding or appropriate hydrocarbon. Preferably in making an acetate we employ a halide derivative of the unsaturated hydrocarbon ethylene having the formula $CH_2:CHX$, where X indicates a halogen atom, e. g., chlorine or bromine. We have discovered that upon bringing the aforesaid halide in contact with an alkali metal hydroxide e. g., caustic soda and/or caustic potash, or an alkaline earth hydroxide, such as calcium hydroxide, or mixtures of one or both groups under proper conditions, a reaction takes place with formation of the acetate of the corresponding metal.

The invention accordingly consists of the steps hereinafter fully described and particularly pointed out in the claims, the following description setting forth but several of the various ways in which the principle of the invention may be utilized.

Our improved method or process is best illustrated by describing the manner in which we form acetic acid, or rather an alkali metal acetate, from vinyl chloride, $CH_2:CHCl$. The latter, which is a gas at ordinary temperatures, may be made in any suitable way. In carrying out the present process such chloride is brought into contact with an alkali metal hydroxide e. g., caustic soda or caustic potash, or a mixture of the two. If such hydroxide or hydroxide mixture be maintained at a proper elevated temperature, a reaction takes place forming sodium acetate. The reaction thus occurring where sodium hydroxide is employed may, it is believed, be represented by the following equation, viz:—

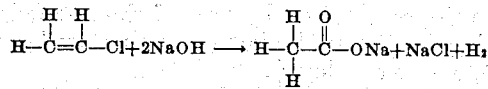

In practice the vinyl chloride is introduced from a cylinder into a suitable closed vessel containing caustic soda, such last mentioned vessel with its contents being maintained at a temperature of from approximately 250 to 350 degrees C. A pressure up to 50 pounds apparently has been found advantageous, although not absolutely necessary. Samples of gas are taken from the reaction vessel at intervals and when the vinyl chloride has largely disappeared, the pressure is released and a fresh charge of such chloride introduced. As indicated by the foregoing equation, hydrogen is liberated in the reaction so that the pressure does not change materially during its progress. While at the highest indicated temperature the caustic soda will initially be in liquid form, but because of the accumulation of sodium chloride and sodium acetate resulting from the reaction of the mass within the vessel it will not continue in such form, but this apparently has no effect on the rate of the reaction.

In commercial practice it is not always feasible to obtain a pure chemical such as ethylene dichloride or vinyl chloride, the halogenated derivatives being usually derived from a mixture of ethylene, propylene and butylene or others. Naturally such a mixture can well be reacted with the caustic soda or with the alkali hydroxide to form a mixture of salts of the aliphatic acids such as acetic, propionic, butyric, etc. This mixture of salts may be acidified and the acids extracted and separated by any of the well-known methods.

We particularly wish to point out that the process as outlined is not only applicable to vinyl chloride, but also to other halogenated aliphatic hydrocarbons, such halogenated hydrocarbons not being confined to the ethylene series but may be of the methane series. In fact we may use any saturated halogenated aliphatic hydrocarbon capable of being converted to a vinyl halide or a homologue thereof by splitting off hydrogen halide when heated with an alkali, i. e. any dihalogenated aliphatic hydrocarbon having the general formula, $C_nH_{2n}X_2$, where X represents a halogen. For example in lieu of vinyl chloride, ethylene dichloride may be used or other dihalogen substituted ethane compounds. Further than this, if one desires to prepare an acid such as propionic acid, the natural starting material would be alpha chlor propylene which would in reaction with caustic soda produce sodium propionate. If one desired to prepare butyric acid, the starting material would be preferably alpha chlor-1-butylene. Compounds which would produce any of these designated monochlor derivatives by reaction with caustic soda would proceed to give the salts of the acids listed. Further than this, higher halogenated hydrocarbons will produce substituted aliphatic acids; for example, chlorethylidene chloride would produce glycollic acid.

If we chose as our starting material propylene dichloride, we would obtain a mixture of salts of acetic and propionic acids in the reaction product due to the fact of variable decomposition.

The illustrations which have been given serve to show the diversified character of the reaction between halogenated aliphatic hydrocarbons of the types mentioned with caustic alkali to produce salts of the corresponding aliphatic acids possible combinations which might be utilized in this process. The examples given show but a few of the combinations or compounds which may be utilized.

While anhydrous alkali metal hydroxides work best, they are not absolutely necessary for our process, in fact, ordinary caustic alkali, for instance commercial caustic alkali soda analyzing approximately 95% NaOH and less than ½ of 1% water is satisfactory. In our process we prefer to use the alkali in flaked or granular form although this form is not essential. We also have found that the reaction will take place with as much as 10% water present in the alkali, but that the rate of reaction will be only about $\frac{1}{10}$ as rapid as with alkali containing less than ½ of 1% water. A still greater percentage of water could be used but the rate of reaction would be still slower. However, in order to maintain the proper rate of reaction when using aqueous alkali, higher pressures and temperatures must be employed.

The temperature for carrying out the process of making organic acids and derivatives will vary with the product and ingredients used. In general this process can be satisfactorily carried out within the temperature range of 100 to 500° C.

Where the caustic alkali reagent is made up of approximately equal parts of sodium hydroxide and potassium hydroxide, the reaction with formation of acetate occurs at approximately 260 degrees C. Potash being relatively expensive, it would obviously be advantageous to cause the reaction to take place between vinyl chloride and caustic soda alone. The latter, however, melts at a higher temperature and the reaction apparently does not proceed as rapidly with it alone. For example, thus operating with caustic soda at a temperature of approximately 325 degrees C., it takes about four times as long to react with the same amount of vinyl chloride as with the mixture of the two hydroxides. We have found, however, that the rate of the reaction where thus operating with sodium hydroxide may be increased by the addition to the mixture of a small amount of a suitable catalyst, such as copper powder. Such increase in speed of reaction apparently does not take place immediately upon the addition of the copper powder, but after an interval of several hours, the reaction becomes just as rapid as where a mixture of the hydroxides is employed.

While the reaction will proceed satisfactorily with the mass in the reacting vessel undisturbed, such mass may be stirred, if desired, to facilitate contact of the gaseous vinyl chloride therewith. The hydrogen given off as a result of the reaction will carry with it a certain amount of vinyl chloride and such gaseous mixture may be advantageously withdrawn and passed through a condenser where it is subjected to such temperature and pressure conditions as will cause the chloride to condense out, or the gaseous mixture may be passed over an agent capable of absorbing the vinyl chloride. The latter may be recovered and returned to the reaction. Furthermore, a series of reaction chambers may be employed and the gaseous vinyl chloride with increasing admixture of hydrogen then passed in succession through such chambers, such operation being in effect on the counterflow principle, the strong vinyl chloride being brought in contact with the nearly spent caustic alkali and the gaseous mixture with low content of the chloride being brought in contact with fresh caustic alkali.

From the acetic acid process as described above it will be obvious that an alkali metal salt of acetic acid, and not the acid itself, will be obtained. However, the production of acetic acid from such salt by acidifying the latter and then distilling off the acetic acid thus set free may be accomplished in any well known manner. Similarly in the process of making other organic acids or derivatives, the corresponding salts will be produced, from which the corresponding acid can be prepared in any well-known manner.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of making a salt of an aliphatic carboxylic acid which comprises reacting an alpha-halogenated ethylene hydrocarbon with a hydroxide of an alkali-forming metal at a temperature between 100° and 500° C.

2. The method of making a salt of an aliphatic carboxylic acid which comprises heating a dihalogenated aliphatic hydrocarbon capable of being converted to an alpha-halogenated ethylene hydrocarbon by splitting off one molecule of hydrogen halide, with an alkali-metal hydroxide at a temperature of approximately 250° to 350° C., said hydroxide being in amount sufficient to convert said dihalogenated hydrocarbon to the corresponding alpha-halogenated ethylene hydrocarbon and to react with the latter to form the salt of an aliphatic carboxylic acid.

3. The method of making an acetate which comprises reacting a vinyl halide with a hydroxide of an alkali-forming metal at a temperature between 100° and 500° C.

4. The method of making an acetate which comprises reacting vinyl chloride with an alkali-metal hydroxide at a temperature of approximately 250° to 350° C.

5. The method of making an acetate which comprises passing vinyl chloride into contact with an alkali-metal hydroxide heated to a temperature between 250° and 350° C. in the presence of not more than 10 per cent of water based upon the weight of said hydroxide.

6. The method of making an acetate which comprises heating ethylene dichloride with an alkali-metal hydroxide at a temperature of approximately 250° to 350° C., said hydroxide being in amount sufficient to convert said dichloride to vinyl chloride and to react with the latter to form an acetate.

7. The method of making an acetate which comprises bringing ethylene dichloride into contact with an alkali-metal hydroxide in amount sufficient to convert said dichloride to vinyl chloride and to react with the latter to form an acetate, the reaction being carried out at a temperature of approximately 250° to 350° C. and in the presence of not more than 10 per cent of water based upon the weight of said hydroxide.

Signed by us, this 13 day of February, 1928.

CHARLES J. STROSACKER.
EARL L. PELTON.